United States Patent
Conway (10) Patent No.: US 7,801,280 B2
(45) Date of Patent: Sep. 21, 2010

(54) METHODS AND SYSTEMS FOR MEASURING THE PERCEPTUAL QUALITY OF COMMUNICATIONS

(75) Inventor: Adrian Evans Conway, Weston, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1667 days.

(21) Appl. No.: 11/012,594

(22) Filed: Dec. 15, 2004

(65) Prior Publication Data

US 2006/0126798 A1 Jun. 15, 2006

(51) Int. Cl.
H04M 1/24 (2006.01)
H04M 3/08 (2006.01)
H04M 3/22 (2006.01)
H04J 1/16 (2006.01)
G10L 15/00 (2006.01)

(52) U.S. Cl. .................. 379/1.03; 379/24; 370/252; 704/236

(58) Field of Classification Search .............. 379/1.01, 379/22.02, 22.08, 23, 24, 26.01, 27.02, 27.08, 379/29.01, 31; 370/241, 252; 704/220, 221, 704/236, 258
See application file for complete search history.

(56) References Cited

U.S. PATENT DOCUMENTS

| | | | | |
|---|---|---|---|---|
| 5,848,384 A * | 12/1998 | Hollier et al. | ................ | 704/231 |
| 6,002,762 A | 12/1999 | Ramsden | ................... | 379/406 |
| 6,035,270 A | 3/2000 | Hollier et al. | ............... | 704/202 |
| 6,201,960 B1 | 3/2001 | Minde et al. | ................ | 455/424 |
| 6,246,978 B1 | 6/2001 | Hardy | ........................ | 704/201 |
| 6,577,996 B1 * | 6/2003 | Jagadeesan | ................. | 704/236 |
| 6,996,068 B1 * | 2/2006 | Sherlock | ..................... | 370/248 |
| 7,197,010 B1 * | 3/2007 | Berstein et al. | ............. | 370/252 |
| 2002/0131604 A1 * | 9/2002 | Amine | ........................ | 381/58 |
| 2002/0167937 A1 * | 11/2002 | Goodman | ................... | 370/352 |
| 2002/0193999 A1 | 12/2002 | Keane et al. | ................ | 704/270 |
| 2006/0093094 A1 * | 5/2006 | Xing et al. | ................. | 379/1.02 |

OTHER PUBLICATIONS

Conway, Adrian E., A Passive Method for Monitoring Voice-over-IP Call Quality with ITU-T Objective Speech Quality Measurement Methods, Feb. 2002, IEEE, p. 2583-2586.
International Telecommunication Union, Series P: Telephone Transmission Quality Methods for Objective and Subjective Assessment of Quality, Aug. 1996, p. 1- 28.
Conway, Adrian E., Output-Based Method of Applying PESQ to Measure the Perceptual Quality of Framed Speech Signals, Mar. 21-25, 2004.
Picovici, D., et al., Towards Non-intrusive Speech Quality Assessment for Modem Telecommunications, Nov. 27, 2001.
Opticom GmbH, Germany, Advanced Non-Intrusive Voice Quality Testing, Opticom, pp. 1-20, "No earlier than May 2004.".

* cited by examiner

*Primary Examiner*—Quoc D Tran (57) ABSTRACT

Described are methods, systems, and devices that include obtaining a first measured perceptual quality by measuring, at a first location associated with a communications network, a perceptual quality of a first communication transmitted from the first location to a second location associated with the communications network, obtaining a second measured perceptual quality by measuring perceptual quality of the first communication at the second location; and, based on the first measured perceptual quality and the second measured perceptual quality, generating a first value representative of degradation in the quality of the first communication.

52 Claims, 8 Drawing Sheets

METHODS AND SYSTEMS FOR MEASURING THE PERCEPTUAL QUALITY OF COMMUNICATIONS

BACKGROUND

To maintain communications networks operating at an acceptable performance level, it can be necessary to frequently monitor and assess the performance of such networks. One common way of assessing the performance of a network is by using objective criteria to examine the received signal and the originally sent signal, and determining to what extent the originally sent signal has been degraded. Objective criteria such as signal level, echo, signal-to-noise ratio, packet-loss rate (in the case of packet-based networks) etc., thus may provide some indication of the performance of the network in question. However, such objective criteria do not always correlate well with the quality of the transmitted communications as perceived by human network users. Accordingly, several methods incorporating mathematical models of the human sensory and perceptual systems, and taking into account typical sources of signal corruptions, automatically assess (i.e., without using live human subjects) the perceptual quality of signals, and by extension, the performance of transmission systems. Amongst such known methods are the Perceptual Analysis Measurement System (or PAMS), the Perceptual Evaluation of Speech Quality (or PESQ) algorithm/scheme, and others. Disadvantageously, these performance evaluation methods, much like objective criteria based schemes, require a reference signal against which the received signal is compared. Such methods that process and compare the received signal to the uncorrupted input signal are often referred to as "input/output-based methods." Consequently, to evaluate network performance using input/output-based signal quality assessment schemes, a known test signal has to be transmitted through the network and then compared at the received end to the uncorrupted version of that test signal, or alternatively, the original uncorrupted version of the signal measured at the receiving end has to be provided at the receiving end to compare it to the corrupted received signal.

To overcome the need to have a reference signal available for the purpose of comparing to the received signal, several known methods have been developed that process only the received signal, and return a value that is indicative of the perceived quality of the signal. These types of quality assessment methods, which take as input only the received signal, are often referred to as "output-based." One example of a commercially available output-based application to perform voice-quality testing is 3SQM™ developed by Opticom GmbH of Germany. Although certain inferences about the performance of a network can be made from measurements produced by such output-based methods, such measurements can be unsatisfactory for the purpose of obtaining accurate information about the performance of a network since the produced measurements can depend on the original form of the transmitted signal. For example, an output-based quality measurement method may produce different assessments depending on the particular speech signal being measured, even though such speech signals are traversing the same network (and may therefore be subject to the same degradation).

DESCRIPTION OF PREFERRED EMBODIMENTS

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

Described herein are preferred methods and systems implemented according to the present invention that include obtaining a first measured perceptual quality by measuring, at a first location associated with a communications network, a perceptual quality of a first communication transmitted from the first location to a second location associated with the communications network, obtaining a second measured perceptual quality by measuring perceptual quality of the first communication at the second location; and, based on the first measured perceptual quality and the second measured perceptual quality, generating a first value representative of degradation in quality of the first communication. Measuring perceptual quality of the first communication at one or more of the first location and the second location can include using an output-based signal quality measuring scheme to obtain the perceptual quality. In an embodiment, the first communication can include a voice call. Accordingly, the communications network can include one or more of a voice network (e.g., PSTN), a packet-based network, and a wireless network.

Generating a first value (e.g., representative of the degradation in quality) can, in the described preferred embodiments, include determining an absolute value of a difference between the first measured perceptual quality and the second measured perceptual quality. The methods and systems described herein can also include transmitting the first measured perceptual quality to the second location, prior to generating the first value. In one embodiment, the first communication and the first measured perceptual quality may be transmitted using a single channel of the communications network, and in some embodiments, the first communication may be transmitted using at least one first channel on the communications network, and the first measured perceptual quality may be transmitted to the second location using at least one distinct second channel. The transmitting can thus include determining an address to which the first measured perceptual quality is to be forwarded, encoding the first measured perceptual quality to provide a first encoded measured perceptual quality; and, forwarding the first encoded measured perceptual quality to the address. Some embodiments can use error-correction codes.

The preferred methods and systems can also include obtaining a third measured perceptual quality by measuring, at the second location, a perceptual quality of a second communication transmitted from the second location to the first location on the communications network, obtaining a fourth measured perceptual quality by measuring perceptual quality of the second communication at the first location, and, based on the third measured perceptual quality and the fourth measured perceptual quality, generating a second value representative of degradation in quality of the second communication. The first communication and second communications can correspond to a voice call between the first location and the second location.

The preferred methods and systems can also include generating a score based on the first value and the second value, the score representative of overall degradation in quality of the first communication and the second communication. As provided herein, "overall" can be understood to be representative of an entire path traveled between the first and second locations. In one embodiment, the score can include an average and/or median based on the first value and the second value. In an embodiment, the score can include a minimum value of the first value and the second value. In some embodiments, the score can include a maximum value of the first value and the second value.

Also described herein are methods and systems implemented according to the present invention that include, at one or more first locations associated with a communications network, measuring a perceptual quality of each of a plurality of communications transmitted across the communications network to provide a first plurality of measured perceptual qualities, at one or more second locations associated with the communications network, measuring a perceptual quality of each of the plurality of communications to provide a second plurality of measured perceptual qualities; and, generating one or more values based on comparing the first plurality of measured perceptual qualities to the second plurality (e.g., a corresponding second) of measured perceptual qualities, the value(s) representing a degradation in quality of the plurality of communications. Measuring of perceptual quality can include using an output-based signal quality measuring scheme. The plurality of communications can include at least one voice call. For example, the plurality of communications can correspond to a multi-party conference call, individual calls, and/or a voice call broadcast. The communications network can include at least one of a voice network, a packet-based network, and a wireless network.

Generating one or more values can include determining an absolute value of a difference between the first plurality of measured perceptual qualities and the second plurality of measured perceptual qualities. The preferred methods and systems can thus also include transmitting the first plurality of measured perceptual qualities to the one or more second locations, prior to generating the one or more values.

In an embodiment, each of the plurality of communications may be transmitted using at least one first channel, and wherein the first plurality of measured perceptual qualities is transmitted using the first channel(s). In an embodiment, each of the plurality of communications may be transmitted using at least one first channel, and wherein the first plurality of measured perceptual qualities may be transmitted using at least one distinct second channel. The transmitting can include determining a plurality of addresses to which the first plurality of measured perceptual qualities is to be forwarded, encoding the first plurality measured perceptual qualities to provide a first plurality of encoded measured perceptual qualities; and, forwarding the first plurality of encoded measured perceptual quality to the plurality of addresses.

The preferred methods and systems can include generating a score based on the value(s), the score representative of overall degradation in quality of the plurality of communications. The score can include an average based on the value(s), a median value of the value(s), a minimum value of the value(s), and/or a maximum value of the value(s).

Also described herein is a preferred system according to the present invention that includes at least one first measuring apparatus to measure, at one or more first locations associated with a communications network, at least one first perceptual quality of at least one communication transmitted from the first location to one or more second locations associated with the communications network, at least one second measuring apparatus to measure at least one second perceptual quality of the communication(s) at the second location(s), at least one comparator for comparing the first perceptual quality and the second perceptual quality to generate at least one value representing degradation in quality of the at least one communication, and, at least one transmitter for transmitting at least one of: the first perceptual quality(s) to the second location(s), the second perceptual quality(s) to the first location(s), and, the first perceptual quality(s) and the second perceptual quality(s) to one or more third locations associated with the communications network.

The first measuring apparatus(s) and the second measuring apparatus(s) can implement at least one output-based signal quality measuring scheme, and the first measuring apparatus(s) can receive as input the communication(s) at the first location(s), and the second measuring apparatus(s) can receive as input the communication(s) at the second location(s). The communication(s) can include a voice call, and the communications network can include at least one of a voice network, a packet-based network, and a wireless network.

The value(s) can include an absolute value of a difference between the first perceptual quality(s) and the second perceptual quality(s). The communication(s) can be related to another of the communication(s).

The systems can also include at least one monitoring node to receive the value(s) representing a degradation in quality of each of the communications, and to generate at least one score indicative of overall degradation in quality of the communications based on the value(s). The score(s) can include at least one average and/or median determined from the value(s), a minimum value of the value(s), and/or a maximum value of the value(s).

Also described is a preferred apparatus implemented according to the present invention that includes a perceptual quality measuring device to generate at least one first perceptual quality of the communication(s) at a first location associated with the communications network, a receiver to receive at least one second perceptual quality measured at a second location on the communications network; and, a comparator to compare the first perceptual quality to the second perceptual quality, and generate a degradation value representative of a degradation in quality of the communication(s) based on the first perceptual quality and the second perceptual quality.

Figure 1:
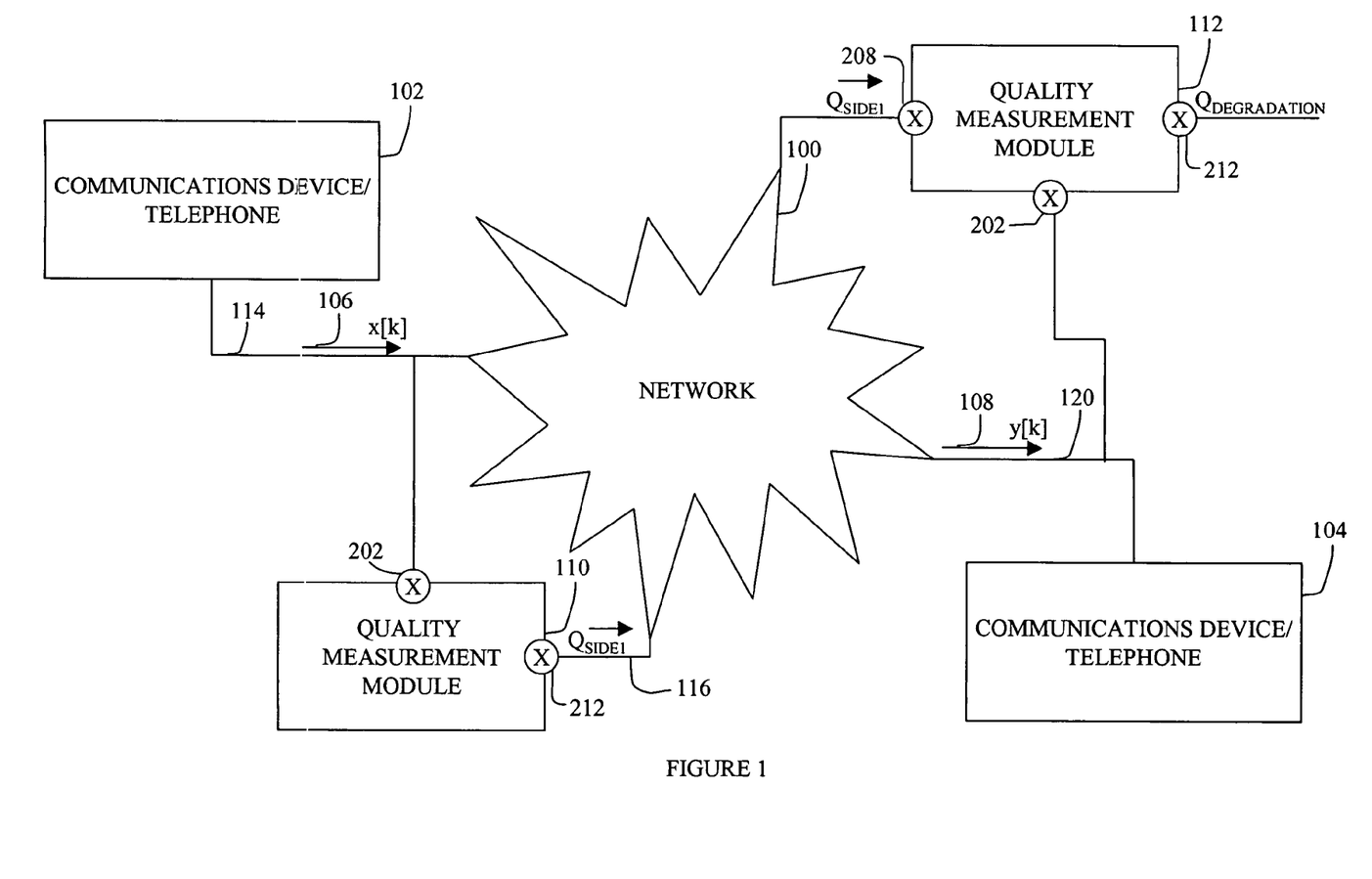
FIG. 1 is a schematic diagram of one embodiment of a signal quality assessment system disclosed herein, coupled to a communications network.

FIG. 1 shows an embodiment of a system for applying an output-based method at both ends of a communications network (e.g., two-sided) where such output-based method can measure the perceptual quality of a signal, and providing an indication as to whether there has been signal degradation as a result of the transmission of the signal over a communications network. Connected to a communications network 100 are first and second communication devices 102 and 104, which in FIG. 1 are shown to be telephone devices. The network 100 may be a telephony network, such as the Public Switched Telephone Network (PSTN), a packet-based network, such as the public Internet, a cellular (i.e., wireless) network, and/or another type of network. Network 100 may enable transmission of speech based signals (i.e., phone calls), dual tone multi-frequency (DTMF) signals, or other signals such as video signals, audio signals, and/or image data. Although first and second communications devices 102 and 104 are shown as telephone devices, first and second communications devices 102 and 104 may be one of numerous types of devices for sending data, including computer modems coupled to computers, video cameras interconnected to network 100, etc. Additionally, it can be understood that for the sake of illustration, only two communications devices are shown as being connected to network 100, but that many additional similar communications devices may be interconnected to network 100.

For the FIG. 1 embodiment, a user (not shown) uses telephone device 102 to send a speech signal 106, which can be, for example, a 16 or 8 bits/sample Pulse Code Modulation (PCM) encoded digital speech signal sampled at a rate of 8 KHz, represented mathematically as a discrete signal x[k], where k is an integer index, to receiving telephone device 104 via network 100. Signal 108, represented mathematically as y[k], is the signal received at communication device 104 corresponding to the original "uncorrupted signal" 106. The signal 106 is typically corrupted while traversing the network 100 en route to second communications device 104. It can be understood that signal 106, and by extension signal 108, need not be speech signals, but may be one of the many types of signals previously enumerated. Further, signals 106 and 108 may be analog signals, or may be sequences of packets containing binary data. Additionally, "corruption" can occur in many different ways, and can be understood to be an alteration of signal x[k].

The signal produced by first communications device 102 may be incompatible with network 100. For example, first communications device 102 may produce an analog signal, whereas network 100 may be configured for digital signals. Under such circumstances it can be necessary to either modify first communications device 102 to produce a given signal format, and/or to couple to first device 102 a format conversion apparatus that can convert the signal produced by first device 102 to a format compatible with network 100 (e.g., an analog-to-digital converter if an analog signal has to be converted to a digital signal). Similarly, second communications device 104 could either be compatible with the proper signal format for network 100, or alternatively, could be coupled to a signal conversion apparatus that could convert received signal 108 into a format compatible with second communications device 104.

Figure 2A:
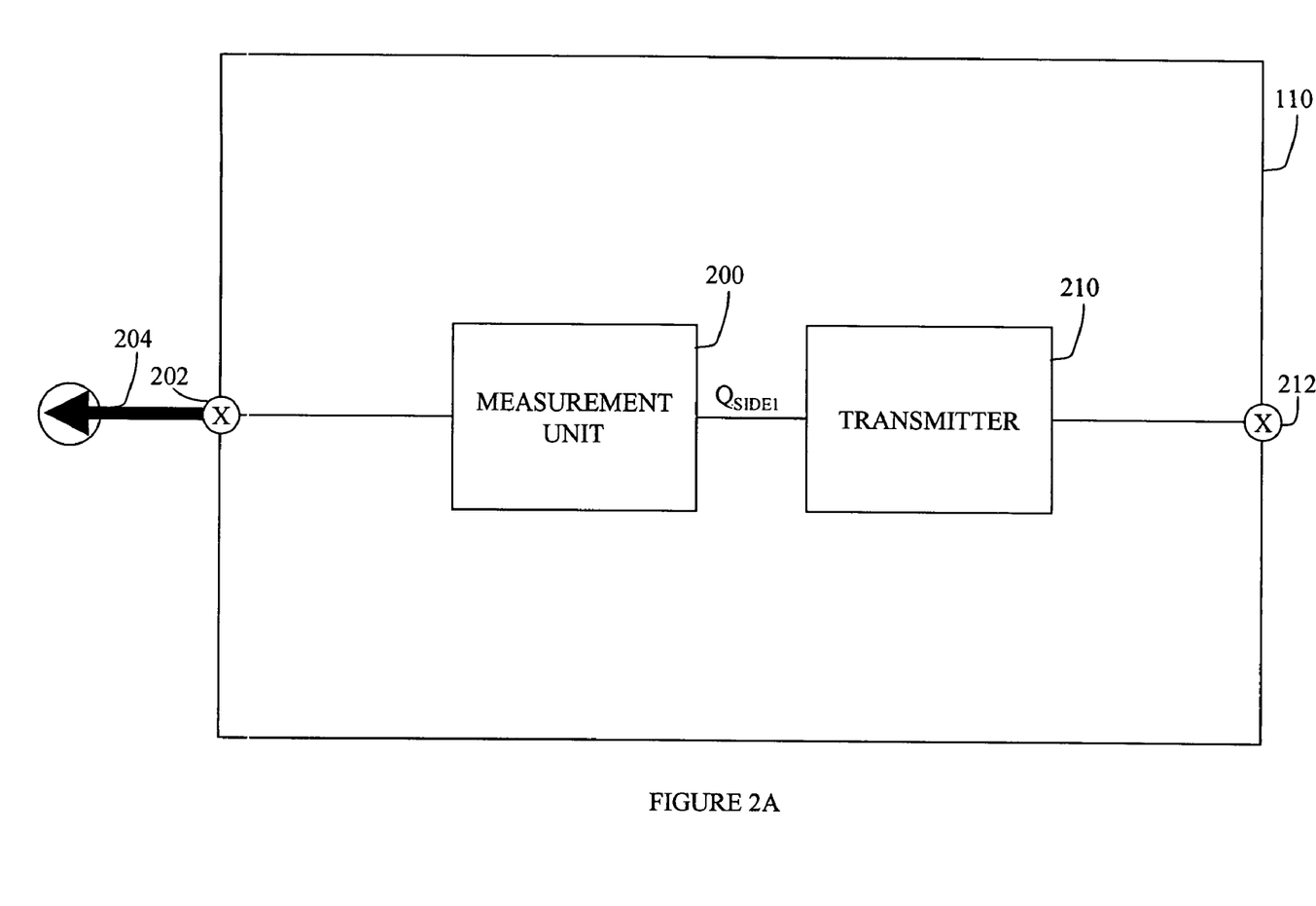
FIG. 2A is a schematic diagram of a first embodiment of a quality measurement module for measuring the perceptual quality of transmitted signals disclosed in this application and forming part of a system according to FIG. 1.
Figure 2B:
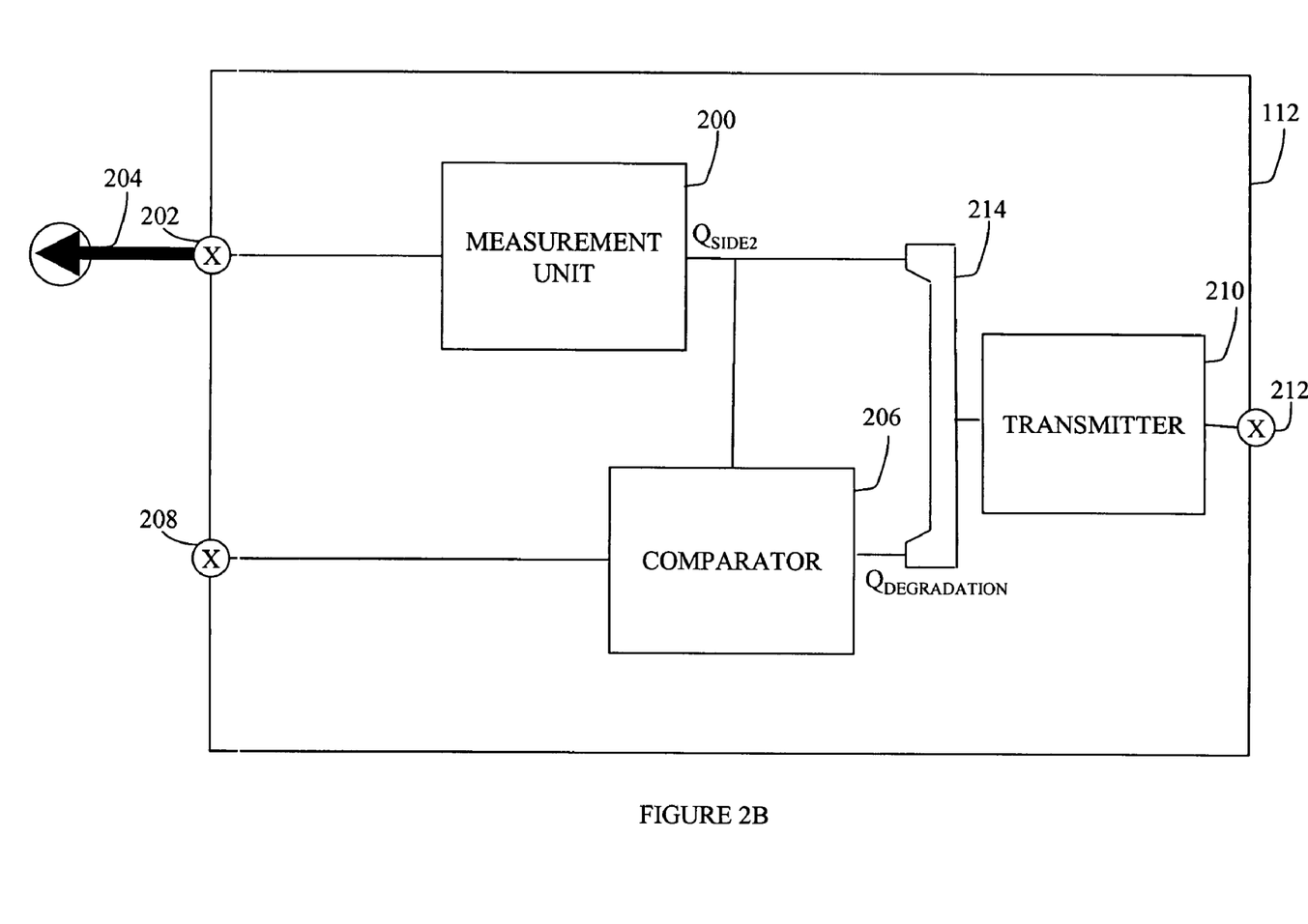
FIG. 2B is a schematic diagram of a second embodiment of a quality measurement module for measuring the perceptual quality of received signals disclosed in this application and forming part of a system according to FIG. 1.

As also seen in FIG. 1, coupled to the output of first communications device 102 is quality measurement module 110 which probes the signal 106 and produces a value corresponding to the perceptual quality of signal 106. A similar measurement module 112 is also coupled to the input of second communications device 104 and probes received signal 108. FIGS. 2A and 2B provide more detailed block schematics of two embodiments of quality measurement modules 110 and 112 respectively, that may be used with a system according to FIG. 1. Modules 110 and 112 can thus each include a measurement unit 200 that is connected to input port 202 through which the signal to be examined is presented as input. Optionally, a signal probe 204 can be connected to input port 202, and probe 204 can be physically connected to the physical link connecting communication device 102 or 104 to network 100 (shown in FIG. 1 as connection 114 and 120 respectively).

As noted, probing and measurement unit 200 of module 110 receives as input the signal 106, represented as x[k], examines an identifiable segment of pre-determined duration of that signal (for example, the segment may be the start and end of a voice call), and yields a value that is representative of the perceptual quality of the signal. Similarly, measurement unit 200 of module 112 receives as input the signal 108, represented as y[k], and examines a similarly identifiable segment of pre-determined duration of that signal (which, for example, may also be the start and end of the voice call) to yield a value that is representative of the perceptual quality of y[k]. Segment identification information may be mutually predetermined by modules 110, 112, or may be provided from another source (such as a monitoring node, such as described further below).

More particularly, in the embodiment disclosed herein, unit 200 is a CPU based device, also including memory elements and/or other peripheral devices and control circuitry to execute a hardware and/or software implementation of output-based perceptual quality assessment schemes such as 3SQM™. Output-based speech quality assessment schemes can use a variety of analysis schemes and techniques to assess the quality of the signal being examined. For example, output-based speech assessment schemes may use speech spectrogram analysis methodologies to analyze acoustic and phonetic information of the received signal, and glean from that information a measure indicative of the perceptual quality of the signal. Another scheme that may be employed in the implementation of output-based speech assessment schemes is the use of vocal-tract modeling techniques to predict the quality of the signal being examined. Yet another possible scheme to determine the perceptual quality of a speech signal in an output-based system is to use speech-recognition systems. There are several other possible techniques and/or schemes for assessing the perceptual speech quality of a signal, which do not compare the signal to the original uncorrupted signal or some other reference signal. Those versed in the art will recognize that many different output-based schemes can thus be constructed which incorporate one or more of the above-noted schemes/techniques. It can also be understood that unit 200 need not be CPU-based, and that the implementation of the particular perceptual quality assessment algorithm/scheme to be used can employ a finite state machine (i.e., where execution of the scheme is not controlled by a CPU), a programmable gate-array implementation, and other implementations.

In the system illustrated in FIG. 1, a perceptual quality value is produced at two locations on the system: one at the transmitted end of the system, and one at the receiving end of the system. The perceptual quality value corresponding to the transmitted signal 106, as produced by unit 200 (FIG. 2A) of module 110 is designated $Q_{side1}$. Hereinafter, references to the perceptual quality value produced by the systems herein described with respect to transmitted signals, will be designated as $Q_{side1}$. The perceptual quality value corresponding to the received signal, as produced by unit 200 (FIG. 2B) of module 112, will be designated $Q_{side2}$. Hereinafter, references to the perceptual quality value produced by the systems herein described with respect to received signals, will be designated as $Q_{side2}$.

Module 112 also comprises comparator 206 which produces a value, based on two or more perceptual quality values, that is representative of the extent of signal degradation. Such a degradation value is, in turn, reflective of the performance of network 100. On the other hand, the FIG. 2A embodiment of module 110 does not comprise a similar comparator 206. For the purposes of the present discussion, it can be understood that degradation values are computed by the measurement module measuring the received signal (module 112 in FIG. 1), although, it can be understood that in some embodiments, a measurement module that can measure the perceptual quality of the transmitted signal (module 110 in FIG. 1) could also compute the degradation value. For those embodiments of module 110 that also measure the degradation value, module 110 could also include comparator 206. In the embodiment described herein, comparator 206 of module 112 receives as input the perceptual quality value of signal 108 produced by measuring unit 200 of module 112, as well as the perceptual quality value of signal 106 produced by unit 200 of module 110 (and thus transmitted via the network 100). The perceptual quality value corresponding to signal 106 may be received at input port 208 of module 112. In accordance with the embodiment of the system and method described herein, comparator 206 of module 112 subsequently produces the degradation value, shown in FIGS. 1 and 2 as $Q_{degradation}$ which indicates the extent of signal degradation that the signal 106 has undergone. One possible formula that can be employed by comparator 206 of the extent of signal degradation value is the absolute difference between the perceptual quality produced at the receiving end and the perceptual quality of the uncorrupted signal (i.e., $Q_{degradation}=|Q_{side2}-Q_{side1}|$). This relationship is but one possible way of deriving a degradation value from the two perceptual quality measures taken at module 110 and module 112, and other possible formulas can be used that could give a value indicative of the extent of signal degradation over network 100. Also, as noted above, other pertinent values may be used in computing the degradation value, such as additional perceptual quality values (possibly generated by other measuring modules at intermediate points along the path traveled by the signal 106 on its way to communications device 104). Comparator 206 need not form part of module 112 (or of module 110, if an embodiment of module 110 includes a comparator 206), but can instead be a separate unit that is either coupled to module 112, or is otherwise situated at another location on network 100.

The perceptual quality value corresponding to signal 106, namely $Q_{side1}$, may be transmitted to module 112 via network 100 (through link 116, as shown in FIG. 1, connecting module 110 to network 100, and subsequently through link 118, connecting network 100 to module 112), or through an independent link interconnecting module 110 to module 112 (not shown). $Q_{side1}$ may be encoded using error correction codes, or using other error prevention coding schemes, to reduce, or altogether eliminate, the possibility that the value of $Q_{side1}$ could be corrupted, thus compromising the reliability of the derived value of $Q_{degradation}$ at module 112.

Transmission of $Q_{side1}$ from module 110 to module 112 can be done through transmitter 210, shown in FIG. 2A, which receives the $Q_{side1}$ value from measurement unit 200, performs encoding, and places (the encoded version of the) value $Q_{side1}$ at the output port 212 of module 110. The disclosed methods and systems are not limited by encoding scheme. For example, transmitter 210 of module 110 may represent $Q_{side1}$ in binary form, encode the binary representation using Reed-Solomon codes, and convert the resultant encoded value into dual tone multi-frequency (DTMF) signals that may thereafter be transmitted over a telephony network. Other types of encoding schemes and representation for $Q_{side1}$ are also possible. Optionally, as illustrated in FIG. 2B, module 112 may also include a multiplexer 214 that takes as input the degradation value $Q_{degradation}$ produced by comparator 206, and the perceptual quality measure ($Q_{side1}$ or $Q_{side2}$) produced by measurement unit 200. Control circuitry (not shown), which may also control the overall operation of module 112, can then select which of the multiplexer's input signals could be directed to the multiplexer's output, and in turn be forwarded to transmitter 210. Multiplexer 214 thus allows measurement module 112 to either forward a measured perceptual quality of a signal (such as $Q_{side2}$), or the determined degradation value (such as $Q_{degradation}$ determined by comparator 206 of module 112) to another location on the network for further processing and analysis. Where the $Q_{degradation}$ value is to be transmitted to a remote location, transmitter 210 may use error correction encoding schemes to render the $Q_{degradation}$ value more immune to signal corruption during transmission of the value to the remote location. It can also be understood that, although not shown in FIG. 2A, some embodiments of module 110, particularly those embodiments which also include a comparator 206, may also include a multiplexer 214. Such embodiments of module 110 could then be able to send either a perceptual quality value (such as $Q_{side1}$), or a determined degradation value to another network location. It can further be understood that a module 110 similar in construction and configuration to module 112, as shown in FIG. 2B, may be used, notwithstanding that some of the components and parts of such a module, like a comparator 206 and/or a multiplexer 214, are not required for the operation of module 110. Under those circumstances, the components and parts of module 110 that are not required for proper operation of that module may be disabled.

Figure 3:
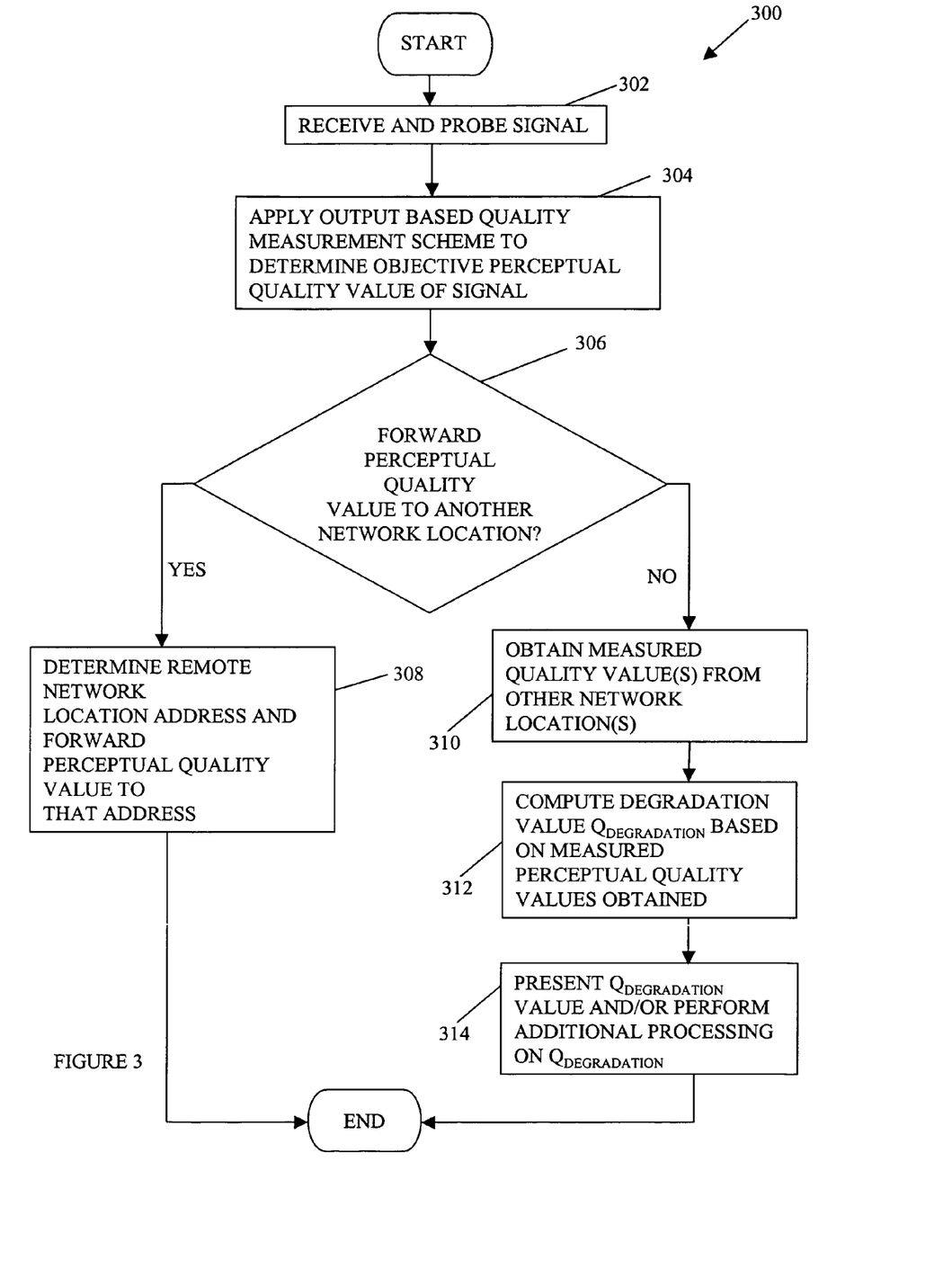
FIG. 3 is a block flow diagram of the quality measurement module according to FIG. 2 in operation.

FIG. 3 is a flow diagram 300 showing an exemplary embodiment of measurement module 112 in operation. As can be seen, the measurement unit of module 112 receives and probes the signal 108 (302 in FIG. 3). The measurement unit 200 can then apply the particular output-based (i.e., output-based) perceptual quality assessment scheme implemented in it to the received signal 108 (304 in FIG. 3). The application of the perceptual quality assessment scheme to signal 108 results in a perceptual quality value $Q_{side2}$ which corresponds to the perceptual quality of the signal as determined with reference only to that signal.

Once the perceptual quality value $Q_{side2}$ has been computed, module 112 determines whether this determined value should be forwarded to a remote location where further processing, including the determination of the degradation value $Q_{degradation}$, is to be performed (306 in FIG. 3). A decision as to whether the calculation of $Q_{degradation}$ is to be performed by module 112 or at a remote location can be based on preferences of the network operators, configuration data, or whether other Q values needed for calculation of the degradation value, such as $Q_{side1}$, were forwarded to module 112, etc. If module 112 determines that $Q_{degradation}$ is not to be determined by the module, the computed perceptual quality value $Q_{side2}$ is provided to transmitter 210 via multiplexer 214. Transmitter 210 determines the location to which the computed $Q_{side2}$ value is to be forwarded (the remote location address can be set by the network operators, or it can be determined from information received by module 112 indicating the remote location address), performs optional encoding on $Q_{side2}$ (e.g., using error-correction codes), and transmits $Q_{side2}$ to the remote location (308 in FIG. 3). If, on the other hand, module 112 determines that the degradation value is to be computed by the module, comparator 206 of module 112 receives the perceptual quality value corresponding to the originally transmitted signal 106 (i.e., $Q_{side1}$), and/or other values needed for computation of the degradation value (310 in FIG. 3). If the $Q_{side1}$ value is not yet available at the input port 208 of module 112, comparator 206 may wait for a predetermined period of time, and if the $Q_{side1}$ value is still not available at that point, module 112, through its control circuitry, may, for example, extract from received signal 108 the address information of the network location where module 110 is located, and thereafter send a request to module 110 to re-transmit the $Q_{side1}$ value. If the latter approach for determining the location of other measurement modules is to be used, the various measurement modules may be assigned network addresses related to the network addresses or locations of the communications devices to which those modules are coupled (i.e., a measurement module's network address could be based on the address of the communications device to which the module is coupled). Alternatively, the control center of module 112 may re-initiate the entire degradation value measurement procedure by sending a request to module 110 to start a new perceptual quality measurement for a new segment(s) of signal 106, and have measurement unit 200 of module 112 perform a new measurement on the corresponding segment(s) of received signal 108. In some embodiments where a separate transmit channel for the $Q_{side1}$ value is used, an identifier can be transmitted with the $Q_{side1}$ value and also with the transmitted signal such that the receiver can coordinate the received signals (and $Q_{side2}$ values) with corresponding $Q_{side1}$ values.

Once comparator 206 of module 112 has received the $Q_{side1}$ value, comparator 206 uses the $Q_{side1}$ and $Q_{side2}$ values to compute the degradation value, $Q_{degradation}$, according to the embodiment, but based on the $Q_{side1}$ and $Q_{side2}$ values (312 in FIG. 3). As previously noted, in the embodiment disclosed herein the degradation formula used is: $Q_{degradation}=|Q_{side2}-Q_{side1}|$; however, other degradation formulas may be used, and furthermore, $Q_{degradation}$ may also be based on additional measurements, such as additional perceptual quality measurements of the originally sent signal 106 measured at different points along the signal's transmission path.

Once determined, module 112 presents the $Q_{degradation}$ value to the various entities/person(s) that require the information (314 in FIG. 3). More particularly, module 112 may display the computed $Q_{degradation}$ value on a monitor device that may be attached to module 112, may cause the $Q_{degradation}$ value to be articulated, store the value in memory elements that may be available with the control circuitry of the module (not shown), perform further processing on the resultant degradation value, and/or may otherwise transmit the degradation value to a remote location for further processing. Where the module 112 is configured to transmit the $Q_{degradation}$ value to a remote location, the control circuitry controlling multiplexer 214 can place the output of comparator 206 (namely, the $Q_{degradation}$ value) at the input to transmitter 210 of module 112, and the transmitter can transmit the $Q_{degradation}$ value to the particular remote network location in the manner previously described.

As previously noted, operation of the embodiment of module 110 illustrated in FIG. 2A includes measuring the perceptual quality of the transmitted signal 102, and transmission of the measured value to a remote location. Measurement unit 200 of module 110 receives and probes the signal 106 (e.g., in a manner similar to the operation of 302 in FIG. 3). The measurement unit 200 then applies the output-based perceptual quality assessment scheme that module 112 applies to signal 108 (as shown in 304 of FIG. 3), resulting in a perceptual quality value $Q_{side1}$. The computed perceptual quality value $Q_{side1}$ is provided to transmitter 210 of module 110. Transmitter 210 determines the location to which the computed $Q_{side1}$ value is to be forwarded, which is either the network location of module 112, or some other location to which the perceptual quality values $Q_{side1}$ and $Q_{side2}$ are sent for computation of a degradation value (e.g., the address can be set by the network operators, or it can be determined from information received by module 110 indicating the remote location address). Module 110 may also perform optional encoding on $Q_{side1}$ (e.g., using error-correction codes), before transmitting $Q_{side1}$ to the remote location (in a manner similar to 308 in FIG. 3).

Figure 4:
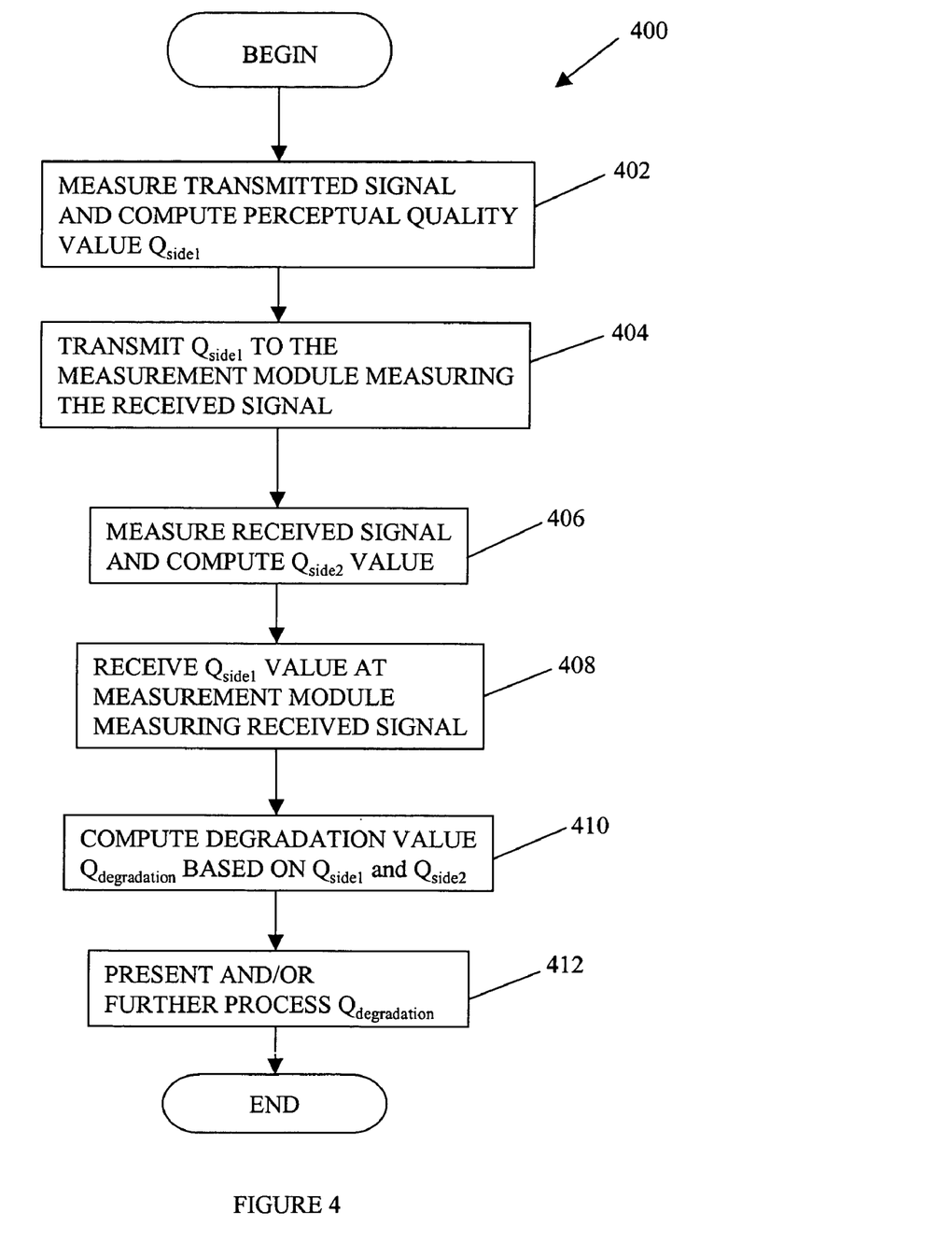
FIG. 4 is a block flow diagram showing a system according to FIG. 1 in operation.

FIG. 4 is a flow diagram 400 showing an exemplary embodiment of the overall operation of a system according to FIG. 1. Measuring unit of module 110 measures and computes a perceptual quality value $Q_{side1}$ corresponding to a segment (or more) of transmitted signal 106 using an output-based perceptual quality assessment scheme that is used by the system (402 in FIG. 4). The computed $Q_{side1}$ value is then transmitted by transmitter 210 of module 110 to module 112 (404 in FIG. 4). The transmitted $Q_{side1}$ may be encoded with error correction codes. Module 112 receives signal 108 via the network 100, and determines a perceptual quality value $Q_{side2}$ for a segment (or more) of signal 108 corresponding to the segment (or more) of signal 106 examined by module 110 (406 in FIG. 4). Module 112 receives at input port 208 the $Q_{side1}$ value (408 in FIG. 4). The value $Q_{side1}$ may be received prior to measurement and computation of the $Q_{side2}$ value, and that under those circumstances the $Q_{side1}$ value may be stored in a memory element or buffer coupled to module 112, and thereafter be retrieved by module 112 when the module is ready to proceed with the computation of the degradation value. Module 112 uses the $Q_{side1}$ and $Q_{side2}$ values it now has available to compute a degradation value $Q_{degradation}$ according to the embodiment, which in the illustrated embodiment is: $Q_{degradation}=|Q_{side2}-Q_{side1}|$ (410 in FIG. 4). Further processing with respect to the thus computed degradation value can then be performed (412 in FIG. 4).

Figure 5:
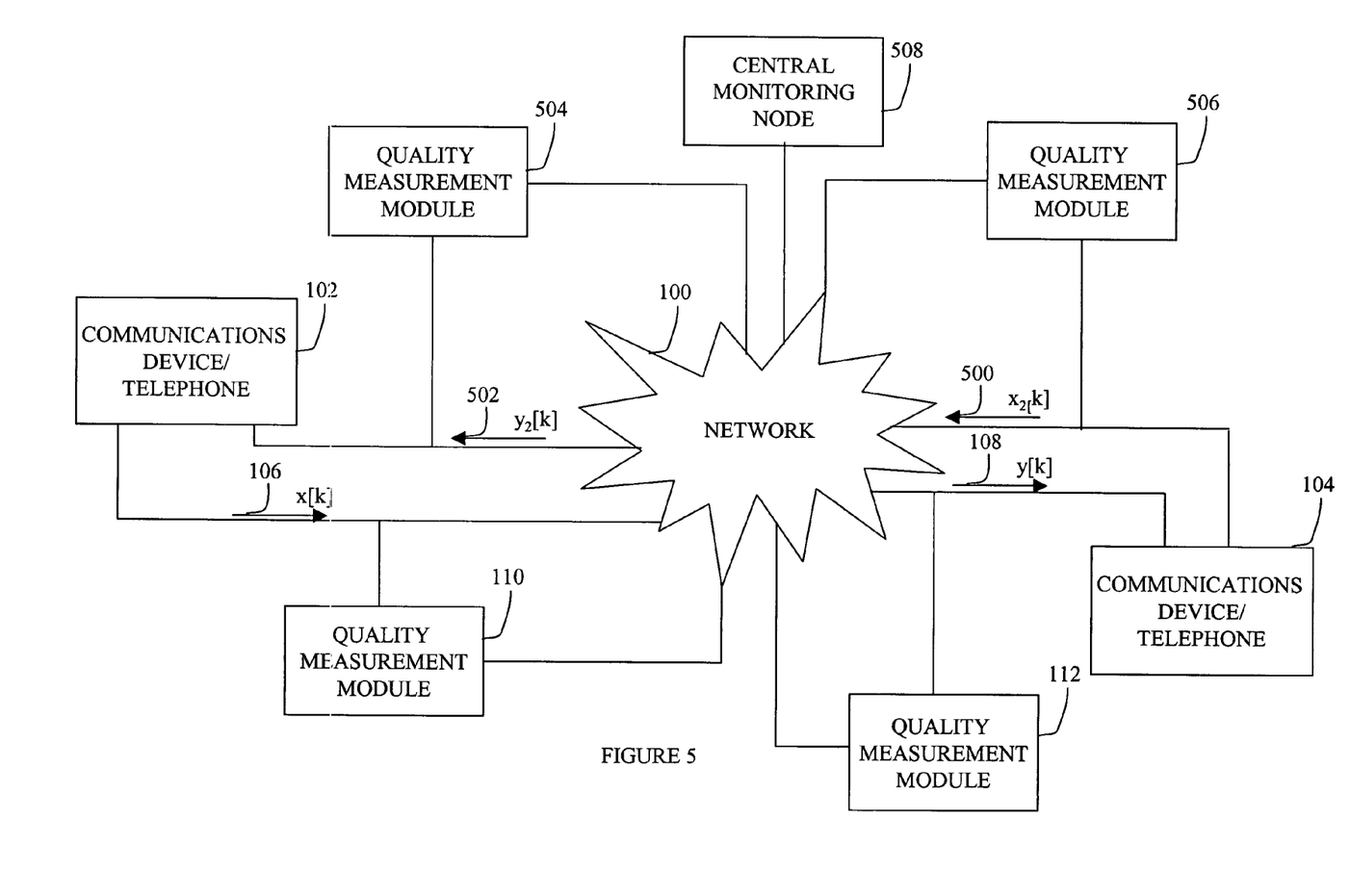
FIG. 5 is a schematic diagram of a second embodiment of one signal quality assessment system disclosed herein, coupled to a communications network.

FIG. 5 illustrates another embodiment exemplary of a system and method described herein, which is a variation of the embodiment of the system illustrated in FIG. 1. The system shown in FIG. 5 handles full-duplex signals, such as bi-directional phone calls or video conferences. FIG. 5 shows communications device 102 sending signal 106 via network 100 to receiving communication device 104. In addition to having a communications path between communications device 102 and 104 through which signal 106 is transmitted via network 100 to communications device 104, FIG. 5 also shows a reciprocal communications path between communications device 104, network 100 and communications device 102, through which signals are transmitted from communications device 104 to communications device 102. FIG. 5 shows signal 500, represented in the figure as $x_2[k]$, being transmitted through network 100 to communications device 102. The signal received at communications device 102, namely signal 502 represented as $y_2[k]$, is the degraded or corrupted version of signal 500. The reciprocal link between communications devices 104 and 102 through which signal 500 is transmitted may correspond to the same physical link through which signal 106 travels from communications device 102 to communications device 104.

Coupled to input of communications devices 102 is quality measurement module 504 which probes and determines the perceptual quality of received signal 502, and coupled to the output of communications device 104 is quality measurement module 506 which probes and determines the perceptual quality of signal 500. Module 504 may be equivalent to module 112 as provided previously herein, whereas module 506 may be equivalent to module 110. A single measurement module (e.g., 504) may be used to compute the perceptual quality value for both signals 106 and 502, and similarly, a single module (e.g., 112) may be used to compute the perceptual quality values for signals 108 and 500.

Comparator 206 of module 504 may subsequently use the $Q_{side2}$ value computed in relation to signal 502 in conjunction with the $Q_{side1}$ value computed by module 506 in relation to signal 500 to compute the $Q_{degradation}$ value corresponding to signals 500 and 502. Alternatively, the $Q_{side2}$ value computed by module 504 may be forwarded to a remote location (to where the $Q_{side1}$ value computed by module 506 could also be forwarded) where the $Q_{degradation}$ value corresponding to signals 500 and 502 could be computed.

As also illustrated by FIG. 5, a central monitoring node 508 may optionally be connected to network 100. Node 508 monitors the overall performance of network 100. As such, node 508 may receive relevant information pertaining to the performance of the network, which may include, among other things, the degradation values produced by modules 112 and 504. Monitoring node 508 may then use the received degradation values to compute a global degradation score that could be representative of the overall performance of network 100. Such a global score may be computed as, for example, an average of the degradation values received by node 508, a median, a minimum, and/or a maximum degradation value from amongst the various degradation values received, and/or another type of global degradation computation scheme. Node 508 may then present the computed global degradation score to the network operators, may perform further processing on the computed score, and/or may store the score in a memory element that may be available in node 508. Node 508 may be implemented as a CPU-based device, comprising memory elements and peripheral devices to enable receiving/transmitting functionality, and/or other circuitry needed for the operation of node 508 and the execution of software thereon. Node 508 need not be a separate stand-alone unit, and measurement modules 110, 112, 504, or 506 may also serve as a monitoring node to receive the degradation values, and other relevant data, and process the data to produce a global degradation score. Where one of the measurement modules is to be used as the monitoring node, some modification to the construction of the module may be required.

The embodiment of the system shown in FIG. 5 can operate similarly to the embodiment of the system shown in FIG. 1, with the exception that an additional $Q_{degradation}$ value may be computed for the signal degradation of signal 502 as compared to signal 500. Accordingly, modules 504 and 506 operate in the same manner and execute the same operational procedures as do modules 112 and 110 respectively. In this manner, degradation can be measured in two directions.

Figure 6:
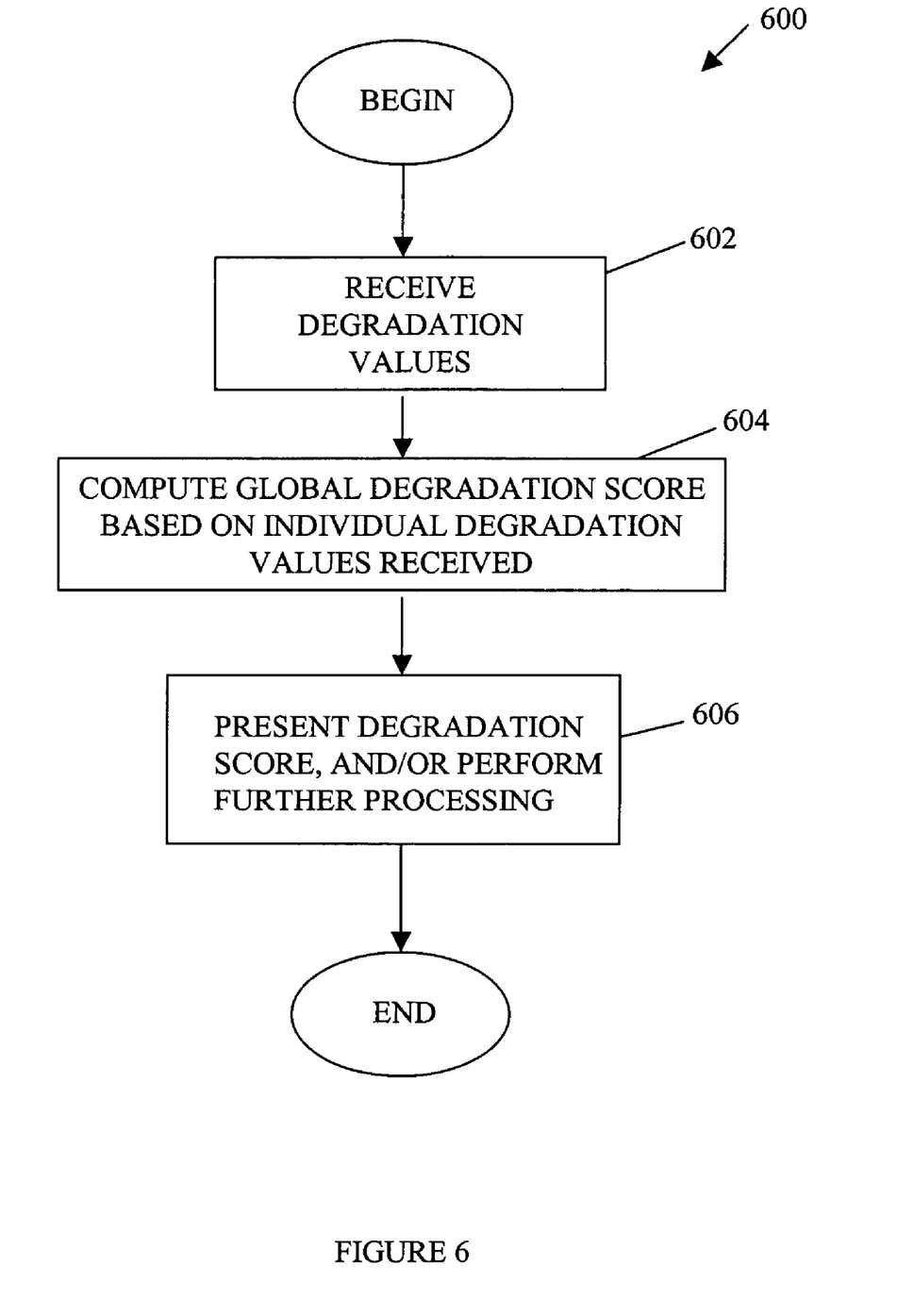
FIG. 6 is a block flow diagram of a monitoring node according to FIG. 5 in operation; and, FIG. 7 is a schematic diagram of a third embodiment of a signal quality assessment system described herein, coupled to a communications network.

FIG. 6 is a flow diagram 600 showing an exemplary embodiment of monitoring node 508 in operation. Node 508 receives the degradation values computed by modules 112 and 504 (602 in FIG. 6). Node 508 may receive these values in an unsynchronized manner (i.e., receive a particular degradation value when it is computed and sent by a particular quality measurement module), until it determines that both modules have sent their respective degradation values. Alternatively, monitoring node 508 may take a more proactive approach and send requests to the various modules to which it is interconnected to have those modules send their corresponding computed degradation values to node 508. Other approaches for receiving the degradation values are also possible. Monitoring node 508 can compute a global degradation score based on the degradation values received from the various measurement modules interconnected to it, representative of the overall performance of network 100 (604 in FIG. 6). As noted above, some of the possible types of scores that can be computed, and which could be reflective of the overall performance of the network, include an arithmetic average of the received degradation values, a median, minimum, or maximum degradation value from amongst the set of received degradation values, etc. Once computed, a global degradation score may be provided to network operator personnel, be used for further processing, sent to a different network location for further processing, or stored at a memory element available at monitoring node 508 (606 in FIG. 6).

Figure 7:
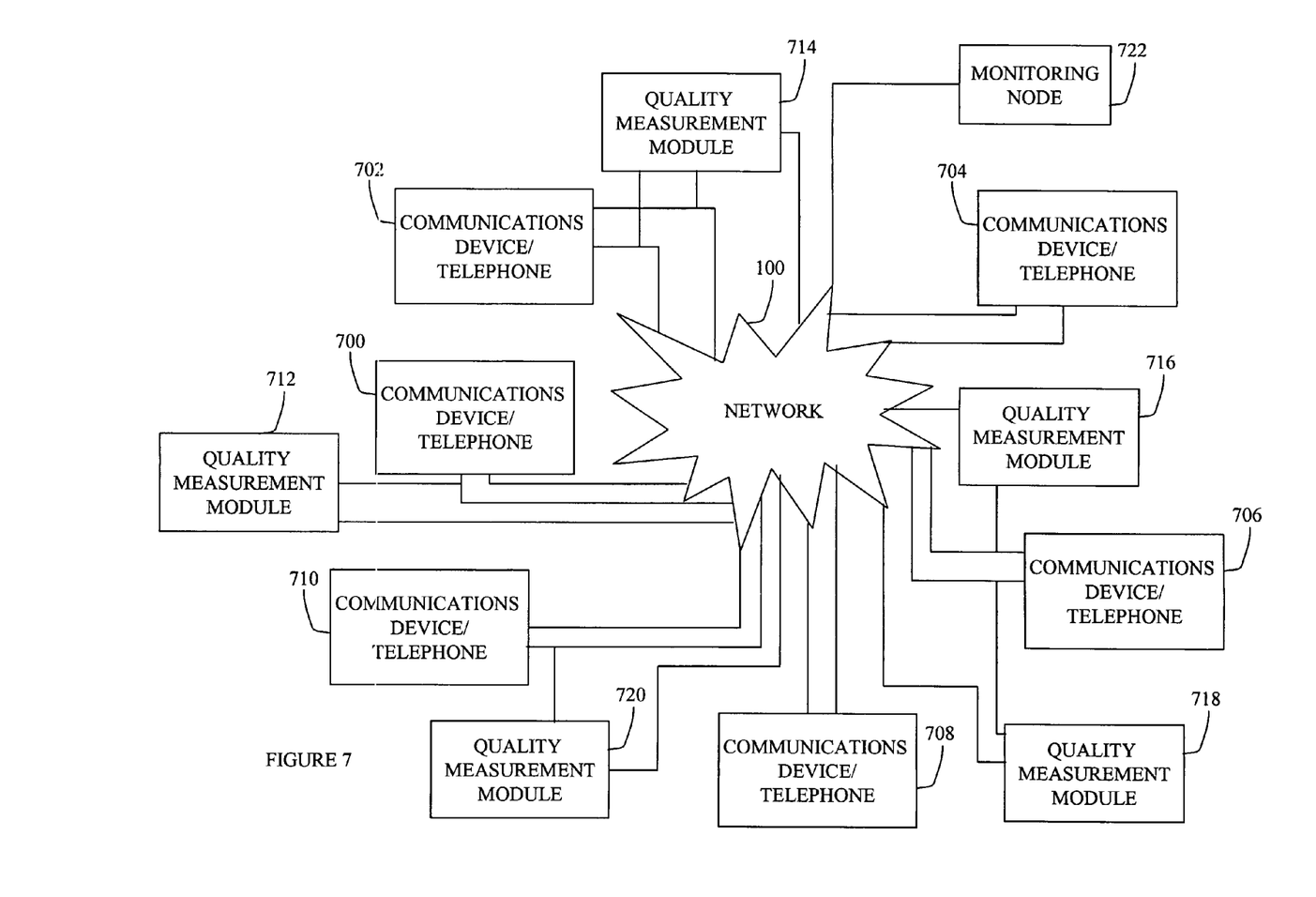

FIG. 7 is a third embodiment of the system described herein, showing a generic configuration of the embodiments shown in FIGS. 1 and 5. More particularly, as shown in FIG. 7, connected to network 100 are a number of communications devices 700, 702, 704, 706, 708, and 710, shown to be telephone devices. The communications devices shown are connected to network 100 in a bi-directional manner, so that each communications device is capable of receiving and sending communications signals. Coupled to some of the communications devices, but not necessarily all of them, are measurement modules 712, 714, 716, 718, 720. As can be seen, a particular communications device may have both signals sent from it and received by it measured by the same measurement module (see communications device 702), may have the perceptual quality of both its received and sent signals measured and computed by separate measuring modules (see communications device 706), or may have the perceptual quality value of either its sent signal or received signal measured by a measurement module (see communications devices 700 and 710). Where a measurement module is coupled to the output of a communications device (i.e., the module can probe and measure the signal being transmitted by the communications device), the measurement module can determine the perceptual quality value for the transmitted signal (i.e., $Q_{side1}$), and subsequently transmit the measured value to those modules coupled to the communications devices receiving the signal. Where a measurement module is coupled to the input of a communications device (i.e., the module probes and measures a received signal), the measurement module can determine the perceptual quality value of the received signal (i.e., $Q_{side2}$), can then receive the $Q_{side1}$ value from the measurement module coupled to the output of the communications device from where the received signal originated, and compute the degradation value $Q_{degradation}$. Also shown in FIG. 7 is monitoring node 722, which is similar to monitoring node 508 shown in FIG. 5. Monitoring node 722 computes a global degradation score representative of the overall performance of the network 100 by obtaining the $Q_{degradation}$ values from the various measurement modules interconnected to unit 722, and then using those values to compute a score. Such a global score may be an arithmetic average of the various degradation values, a minimum, median, or maximum of the degradation values, etc.

In operation, as signals are being transmitted by some of the communications devices, the measurement modules coupled to the outputs of those communications devices measure the perceptual quality values (i.e., the various $Q_{side1}$ values) of the transmitted signals. It is possible that a particular communications device may be broadcasting to several other communications devices which merely receive the broadcast signal, but do not respond to the received signal by sending a reply signal to the broadcasting device. Under those circumstances, only one $Q_{side1}$ value, corresponding to the perceptual quality of the broadcast signal, may be computed.

Measurement modules, coupled to the input of communications devices receiving the transmitted signal, probe and measure those received signal, and produce perceptual quality values (namely, $Q_{side2}$ values) corresponding to those received signals. The modules measuring the perceptual quality of the received signals obtain the corresponding $Q_{side1}$ from the measurement modules coupled to the outputs of the transmitting communications devices. As previously noted, the $Q_{side1}$ values can be transmitted to the appropriate measuring modules by transmitting those values over network 100, possibly first encoding $Q_{side1}$ values using error correction codes to render them more immune to signal corruption that might be occasioned by network 100, or sending the $Q_{side1}$ values through alternate communications links. In situations where there is a single broadcasting communications device, the same $Q_{side1}$ value computed for that broadcasting device can be provided to the measurement modules coupled to the inputs of the receiving communications devices.

The $Q_{degradation}$ values are subsequently computed at the measurement modules measuring the received signals, and those values may be optionally provided to monitoring node 722 to compute a global score representative of the overall performance of network 100.

What is thus disclosed are methods, systems, and devices that include obtaining a first measured perceptual quality by measuring, at a first location associated with a communications network, a perceptual quality of a first communication transmitted from the first location to a second location associated with the communications network, obtaining a second measured perceptual quality by measuring the perceptual quality of the first communication at the second location and, based on the first measured perceptual quality and the second measured perceptual quality, generating a first value representative of the degradation in the quality of the first communication.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Use of such "microprocessor" or "processor" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the internet. References herein to microprocessor instructions or microprocessor-executable instructions, in accordance with the above, can be understood to include programmable hardware.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. For example, the measurement modules described herein may be implemented as a combination of discrete modules, where the measurement unit resides separately from the comparator unit of the modules. Further, the measurement modules may be implemented in software and run from a personal computer station. Additionally, the perceptual quality of a particular communication can be measured at two or more points along the path followed by the particular communication, and not necessarily at the exact point of origin and destination point of that communication. In that respect, it is not necessary that at the points at which perceptual quality measurements of the communication in question are taken that there could be communications devices located there.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method comprising:
   a) obtaining a first measured perceptual quality with a first quality measurement module by measuring, at a first location associated with a communications network, a perceptual quality of a first communication transmitted from said first location to a second location associated with said communications network;
   b) obtaining a second measured perceptual quality with a second quality measurement module by measuring perceptual quality of said first communication at said second location;
   c) transmitting said first measured perceptual quality to said second quality measurement module; and,
   d) based on said first measured perceptual quality and said second measured perceptual quality, generating a first value representative of degradation in quality of said first communication at said second quality measurement module.

2. The method of claim 1, wherein said measuring perceptual quality of said first communication at one or more of said first location and said second location includes using an output-based signal quality measuring scheme to obtain said perceptual quality.

3. The method of claim 1, wherein said first communication includes a voice call.

4. The method of claim 1, wherein said communications network includes at least one of a voice network, a packet-based network, and a wireless network.

5. The method of claim 1, wherein generating a first value comprises determining an absolute value of a difference between said first measured perceptual quality and said second measured perceptual quality.

6. The method of claim 1, wherein said first measured perceptual quality is transmitted to said second location prior to generating said first value.

7. The method of claim 6, wherein said first communication and said first measured perceptual quality are transmitted using a single channel of said communications network.

8. The method of claim 6, wherein said first communication is transmitted using at least one first channel on said communications network, and wherein said first measured perceptual quality is transmitted to said second location using at least one distinct second channel.

9. The method of claim 6, wherein transmitting comprises:
   determining an address to which said first measured perceptual quality is to be forwarded;
   encoding said first measured perceptual quality to provide a first encoded measured perceptual quality; and,
   forwarding said first encoded measured perceptual quality to said address.

10. The method of claim 9, wherein said encoding includes using error-correction codes.

11. A method, comprising:
    a) obtaining a first measured perceptual quality by measuring, at a first location associated with a communications network, a perceptual quality of a first communication transmitted from said first location to a second location associated with said communications network;
    b) obtaining a second measured perceptual quality by measuring perceptual quality of said first communication at said second location;
    c) based on said first measured perceptual quality and said second measured perceptual quality, generating a first value representative of degradation in quality of said first communication;
    d) obtaining a third measured perceptual quality by measuring, at said second location, a perceptual quality of a second communication transmitted from said second location to said first location on said communications network;
    e) obtaining a fourth measured perceptual quality by measuring perceptual quality of said second communication at said first location; and,
    f) based on said third measured perceptual quality and said fourth measured perceptual quality, generating a second value representative of degradation in quality of said second communication.

12. The method of claim 11, wherein said first communication and said second communication correspond to a voice call between said first location and said second location.

13. The method of claim 11, further comprising generating a score based on said first value and said second value, said score representative of overall degradation in quality of said first communication and said second communication.

14. The method of claim 13, wherein said score includes at least one of an average, a median, a maximum and a minimum based on said first value and said second value.

15. A computer product disposed on a computer readable medium, said computer product having instructions to cause a processor to perform the method of claim 1.

16. A method comprising:
a) at one or more first locations associated with a communications network having a first quality measurement module, measuring a perceptual quality of each of a plurality of communications transmitted across said communications network with said first quality measurement module to provide a first plurality of measured perceptual qualities;
b) at one or more second locations associated with said communications network having a second quality measurement module, measuring a perceptual quality of said each of said plurality of communications with said second quality measurement module to provide a second plurality of measured perceptual qualities;
c) transmitting said first plurality of measured perceptual qualities to said second quality measurement module; and,
d) generating one or more values based on comparing each of said first plurality of measured perceptual qualities to a corresponding one of said second plurality of measured perceptual qualities at said second quality measurement module, said one or more values representing a degradation in quality of said plurality of communications.

17. The method of claim 16, wherein said measuring of perceptual quality includes using an output-based signal quality measuring scheme.

18. The method of claim 16, wherein said plurality of communications includes at least one voice call.

19. The method of claim 16, wherein said plurality of communications correspond to a multi-party conference call.

20. The method of claim 16, wherein said plurality of communications correspond to a voice call broadcast.

21. The method of claim 16, wherein said communications network includes at least one of a voice network, a packet-based network, and a wireless network.

22. The method of claim 16, wherein generating one or more values comprises determining an absolute value of a difference between said first plurality of measured perceptual qualities and said second plurality of measured perceptual qualities.

23. The method of claim 16, wherein said first plurality of measured perceptual qualities is transmitted to said one or more second locations prior to generating said one or more values.

24. The method of claim 23, wherein each of said plurality of communications is transmitted using at least one first channel, and wherein said first plurality of measured perceptual qualities is transmitted using said at least one first channel.

25. The method of claim 23, wherein each of said plurality of communications is transmitted using at least one first channel, and wherein said first plurality of measured perceptual qualities is transmitted using at least one distinct second channel.

26. The method of claim 23, wherein said transmitting comprises:
determining one or more addresses to which said first plurality of measured perceptual qualities is to be forwarded;
encoding said first plurality of measured perceptual qualities to provide a first plurality of encoded measured perceptual qualities; and,
forwarding said first plurality of encoded measured perceptual qualities to said one or more addresses.

27. The method of claim 26, wherein said encoding includes using error-correction codes.

28. The method of claim 16, further comprising generating a score based on said one or more values, said score representative of overall degradation in quality of said plurality of communications.

29. The method of claim 28 wherein said score includes at least one of an average, a median, a maximum and a minimum based on one or more values.

30. A system comprising:
a) at least one first measuring apparatus to measure, at one or more first locations associated with a communications network, at least one first perceptual quality of at least one communication transmitted from said one or more first locations to one or more second locations associated with said communications network;
b) at least one second measuring apparatus to measure at least one second perceptual quality of said at least one communication at said one or more second locations;
c) at least one comparator coupled to the at least one first measuring apparatus and the at least one second measuring apparatus configured to compare said first perceptual quality and said second perceptual quality and generate at least one value representing degradation in quality of said at least one communication; and,
d) at least one transmitter for transmitting at least one of:
i. said at least one first perceptual quality to said one or more second locations,
ii. said at least one second perceptual quality to said one or more first locations, and,
iii. said at least one first perceptual quality and said at least one second perceptual quality to one or more third locations associated with said communications network.

31. The system of claim 30, wherein said at least one first measuring apparatus and said at least one second measuring apparatus implement at least one output-based signal quality measuring scheme, and wherein said at least one first measuring apparatus receives as input said at least one communication at said one or more first locations, and said at least one second measuring apparatus receives as input said at least one communication at said one or more second locations.

32. The system of claim 30, wherein said at least one communication includes a voice call.

33. The system of claim 30, wherein said communications network includes at least one of a voice network, a packet-based network, and a wireless network.

34. The system of claim 30, wherein said at least one value includes an absolute value of a difference between said at least one first perceptual quality and said at least one second perceptual quality.

35. The system of claim 30, wherein said at least one communication is related to another of said at least one communication.

36. The system of claim 30, further comprising at least one monitoring node to receive said at least one value representing a degradation in quality of each of said at least one communications, and to generate at least one score indicative of overall degradation in quality of said at least one communications based on said at least one value.

37. The system of claim 36, wherein said at least one score includes at least one of an average, a median, a maximum and a minimum based on said at least one value.

38. An apparatus comprising:
a) a perceptual quality measuring device configured to generate a first perceptual quality of a communication transmitted from a first location to a second location via a communications network, and measured at the first location;

b) a receiver configured to receive a second perceptual quality of said communication measured at the second location; and c) a comparator communicatively coupled to the receiver and the perceptual quality measuring device and configured to compare said first perceptual quality to said second perceptual quality, and generate a degradation value representative of a degradation in quality of said communication based on said first perceptual quality and said second perceptual quality.

39. The apparatus of claim 38, wherein said perceptual quality measuring device implements an output-based signal quality measuring scheme.

40. The apparatus of claim 38, wherein said communication includes a voice call.

41. The apparatus of claim 38, wherein said communications network includes at least one of a voice network, a packet-based network, and a wireless network.

42. The apparatus of claim 38, wherein said degradation value includes an absolute value of a difference between said first perceptual quality and said second perceptual quality.

43. The apparatus of claim 38, further comprising a transmitter communicatively coupled to the comparator and configured to transmit said degradation value to a third location associated with said communications network, and to transmit said first perceptual quality to a fourth location associated with said communications network.

44. A method, comprising:
a) measuring a first perceptual quality at a first location of a communication transmitted from the first location to a second location via a communications network;

b) transmitting the first perceptual quality to the second location;

c) measuring a second perceptual quality at the second location;

d) receiving the second perceptual quality for said communication at the second location; and e) computing with a computing device a degradation value representative of a degradation in quality of said communication based on said first perceptual quality and said second perceptual quality.

45. The method of claim 44, wherein said generating said first perceptual quality includes using an output-based signal quality measuring scheme.

46. The method of claim 44, wherein said communication includes a voice call.

47. The method of claim 44, wherein said communications network includes at least one of a voice network, a packet-based network, and a wireless network.

48. The method of claim 44, wherein said degradation value includes an absolute value of a difference between said first perceptual quality and said second perceptual quality.

49. The method of claim 44, further comprising transmitting said degradation value to a third location via said communications network.

50. The method of claim 44, further comprising transmitting said first perceptual quality to a fourth location via said communications network.

51. A computer product disposed on a computer readable medium, said computer product having instructions to cause a processor to perform the method of claim 44.

52. A computer product disposed on a computer readable medium, said computer product having instructions to cause a processor to perform the method of claim 16.

* * * * *